US006727657B2

(12) United States Patent
Krichtafovitch et al.

(10) Patent No.: US 6,727,657 B2
(45) Date of Patent: Apr. 27, 2004

(54) ELECTROSTATIC FLUID ACCELERATOR FOR AND A METHOD OF CONTROLLING FLUID FLOW

(75) Inventors: Igor A. Krichtafovitch, Kirkland, WA (US); Vladimir L. Gorobets, Redmond, WA (US)

(73) Assignee: Kronos Advanced Technologies, Inc., Belmont, MA (US)

( * ) Notice: Subject to any disclaimer, the term of this patent is extended or adjusted under 35 U.S.C. 154(b) by 0 days.

(21) Appl. No.: 10/188,069

(22) Filed: Jul. 3, 2002

(65) Prior Publication Data

US 2004/0004440 A1 Jan. 8, 2004

(51) Int. Cl.[7] .............................. H01J 7/24; H02N 1/04; B03C 3/08

(52) U.S. Cl. ..................... 315/111.91; 310/308; 55/138

(58) Field of Search ........................ 315/111.91, 111.21, 315/111.61, 111.31, 39, 506, 500, 111.9; 250/423 R, 426; 55/138, 149

(56) References Cited

U.S. PATENT DOCUMENTS

| | | | | |
|---|---|---|---|---|
| 1,888,606 A | | 11/1932 | Nesbit | |
| 2,949,550 A | | 8/1960 | Brown | |
| 3,108,394 A | | 10/1963 | Ellman et al. | |
| 3,267,860 A | | 8/1966 | Brown | |
| 3,374,941 A | | 3/1968 | Okress | |
| 3,518,462 A | | 6/1970 | Brown | |
| 3,582,694 A | | 6/1971 | Gourdine | |
| 3,638,058 A | | 1/1972 | Fritzius | |
| 3,675,096 A | | 7/1972 | Kiess | |
| 3,699,387 A | | 10/1972 | Edwards | |
| 3,751,715 A | | 8/1973 | Edwards | |
| 3,896,347 A | | 7/1975 | Gelfand | |
| 3,936,635 A | | 2/1976 | Clark | |
| 3,983,393 A | | 9/1976 | Thettu et al. | |
| 4,008,057 A | | 2/1977 | Gelfand et al. | |
| 4,011,719 A | | 3/1977 | Banks | |
| 4,061,961 A | | 12/1977 | Baker | |
| 4,086,650 A | | 4/1978 | Davis et al. | |
| 4,124,003 A | | 11/1978 | Abe et al. | |
| 4,156,885 A | | 5/1979 | Baker et al. | |
| 4,162,144 A | | 7/1979 | Cheney | |
| 4,194,888 A | * | 3/1980 | Schwab et al. | 95/78 |
| 4,210,847 A | | 7/1980 | Shannon et al. | |
| 4,231,766 A | * | 11/1980 | Spurgin | 96/79 |
| 4,240,809 A | | 12/1980 | Elsbernd et al. | |
| 4,246,010 A | | 1/1981 | Honacker | |
| 4,266,948 A | | 5/1981 | Teague et al. | |

(List continued on next page.)

OTHER PUBLICATIONS

Manual on Current Mode PWM Controller, LinFinity Microelectronics (SG1842/SG1843 Series, Apr. 2000).

Product Catalog of GE–Ding Information Inc. (From Website—www.redsensor.com.tw).

*Primary Examiner*—Don Wong
*Assistant Examiner*—Chuc Tran
(74) *Attorney, Agent, or Firm*—Fulbright & Jaworski LLP

(57) ABSTRACT

An electrostatic fluid acceleration and method of operation thereof includes at least two synchronously powered stages. A single power supply or synchronized and phase controlled power supplies provide high voltage power to each of the stages such that both the phase and amplitude of the electric power applied to the corresponding electrodes are aligned in time. The frequency and phase control allows neighboring stages to be closely spaced at a distance of from 1 to 2 times an inter-electrode distance within a stage, and, in any case, minimizing or avoiding production of a back corona current from a corona discharge electrode of one stage to an electrode of a neighboring stage. Corona discharge electrodes of neighboring stages may be horizontally aligned, complementary collector electrodes of all stages being similarly horizontally aligned between and horizontally offset from the corona discharge electrodes.

14 Claims, 4 Drawing Sheets

U.S. PATENT DOCUMENTS

| | | | | |
|---|---|---|---|---|
| 4,267,502 | A | | 5/1981 | Reese et al. |
| 4,292,493 | A | | 9/1981 | Selander et al. |
| 4,313,741 | A | | 2/1982 | Masuda et al. |
| 4,335,414 | A | | 6/1982 | Weber |
| 4,351,648 | A | | 9/1982 | Penney |
| 4,379,129 | A | | 4/1983 | Abe |
| 4,380,720 | A | | 4/1983 | Fleck |
| 4,388,274 | A | | 6/1983 | Rourke et al. |
| 4,390,831 | A | | 6/1983 | Byrd et al. |
| 4,567,541 | A | | 1/1986 | Terai |
| 4,587,541 | A | | 5/1986 | Dalman et al. |
| 4,600,411 | A | | 7/1986 | Santamaria |
| 4,643,745 | A | | 2/1987 | Sakakibara et al. |
| 4,673,416 | A | | 6/1987 | Sakakibara et al. |
| 4,689,056 | A | | 8/1987 | Noguchi et al. |
| 4,719,535 | A | | 1/1988 | Zhenjun et al. |
| 4,789,801 | A | * | 12/1988 | Lee ............................ 310/308 |
| 4,812,711 | A | | 3/1989 | Torok et al. |
| 4,837,658 | A | | 6/1989 | Reale |
| 4,853,719 | A | | 8/1989 | Reale |
| 4,853,735 | A | | 8/1989 | Kodama et al. |
| 4,924,937 | A | | 5/1990 | Beal et al. |
| 4,941,353 | A | | 7/1990 | Fukatsu et al. |
| 4,980,611 | A | | 12/1990 | Orenstein |
| 4,996,473 | A | | 2/1991 | Markson et al. |
| 5,012,159 | A | | 4/1991 | Torok et al. |
| 5,024,685 | A | | 6/1991 | Torok et al. |
| 5,055,118 | A | | 10/1991 | Nagoshi et al. |
| 5,077,500 | A | | 12/1991 | Torok et al. |
| 5,155,524 | A | | 10/1992 | Oberhardt et al. |
| 5,245,692 | A | | 9/1993 | Kawai |
| 5,302,190 | A | * | 4/1994 | Williams ....................... 95/57 |
| 5,330,559 | A | | 7/1994 | Cheney et al. |
| 5,469,242 | A | | 11/1995 | Yu et al. |
| 5,474,599 | A | | 12/1995 | Cheney et al. |
| 5,556,448 | A | | 9/1996 | Cheney et al. |
| 5,578,112 | A | | 11/1996 | Krause |
| 5,661,299 | A | | 8/1997 | Purser |
| 5,667,564 | A | | 9/1997 | Weinberg |
| 5,707,428 | A | | 1/1998 | Feldman et al. |
| 5,769,155 | A | | 6/1998 | Ohadi et al. |
| 5,814,135 | A | | 9/1998 | Weinberg |
| 5,827,407 | A | | 10/1998 | Wang et al. |
| 5,892,363 | A | | 4/1999 | Roman |
| 5,899,666 | A | | 5/1999 | Chung et al. |
| D411,001 | S | | 6/1999 | Pinchuk |
| 5,951,957 | A | | 9/1999 | Simpson |
| 5,973,905 | A | | 10/1999 | Shaw |
| 5,982,102 | A | | 11/1999 | Andrzej |
| 5,993,521 | A | | 11/1999 | Loreth et al. |
| D420,438 | S | | 2/2000 | Pinchuk |
| 6,042,637 | A | | 3/2000 | Weinberg |
| 6,056,808 | A | | 5/2000 | Krause |
| D427,300 | S | | 6/2000 | Pinchuk |
| 6,084,350 | A | | 7/2000 | Ezaki et al. |
| 6,125,636 | A | | 10/2000 | Taylor et al. |
| D433,494 | S | | 11/2000 | Pinchuk et al. |
| D434,483 | S | | 11/2000 | Pinchuk |
| 6,145,298 | A | | 11/2000 | Burton |
| 6,152,146 | A | | 11/2000 | Taylor et al. |
| 6,163,098 | A | | 12/2000 | Taylor et al. |
| 6,167,196 | A | | 12/2000 | Huggins et al. |
| 6,176,977 | B1 | | 1/2001 | Taylor et al. |
| 6,182,671 | B1 | | 2/2001 | Taylor et al. |
| D438,513 | S | | 3/2001 | Pinchuk |
| 6,200,539 | B1 | | 3/2001 | Sherman et al. |
| 6,203,600 | B1 | | 3/2001 | Loreth |
| D440,290 | S | | 4/2001 | Pinchuk |
| 6,210,642 | B1 | | 4/2001 | Lee et al. |
| 6,245,126 | B1 | | 6/2001 | Feldman et al. |
| 6,245,132 | B1 | | 6/2001 | Feldman et al. |
| 6,312,507 | B1 | | 11/2001 | Taylor et al. |
| 6,313,064 | B1 | | 11/2001 | Miyafuji et al. |
| 6,350,417 | B1 | | 2/2002 | Lau et al. |
| 2001/0004046 | A1 | | 6/2001 | Taylor et al. |
| 2001/0032544 | A1 | | 10/2001 | Taylor et al. |
| 2001/0048906 | A1 | | 12/2001 | Lau et al. |
| 2002/0079212 | A1 | | 6/2002 | Taylor et al. |
| 2002/0098131 | A1 | | 7/2002 | Taylor et al. |
| 2002/0141914 | A1 | | 10/2002 | Lau et al. |

* cited by examiner

ELECTROSTATIC FLUID ACCELERATOR FOR AND A METHOD OF CONTROLLING FLUID FLOW

RELATED APPLICATIONS

The technology of the present disclosure is related to U.S. Pat. No. 6,504,308 entitled ELECTROSTATIC FLUID ACCELERATOR, issued Jan. 7, 2003, and to U.S. patent application Ser. No. 10/175,947 entitled METHOD OF AND APPARATUS FOR ELECTROSTATIC FLUID ACCELERATION CONTROL OF A FLUID FLOW, filed Jun. 21, 2002, both of which are incorporated herein in their entireties by reference.

BACKGROUND OF THE INVENTION

1. Field of the Invention

The invention relates to a device for and method of accelerating, and thereby imparting velocity and momentum to a fluid, and particularly to the use of corona discharge technology to generate ions and electrical fields especially through the use of ions and electrical fields for the movement and control of fluids such as air.

2. Description of the Related Art

A number of patents (see, e.g., U.S. Pat. No. 4,210,847 by Shannon, et al. and U.S. Pat. No. 4,231,766 by Spurgin) describe ion generation using an electrode (termed the "corona electrode"), attracting and, therefore, accelerating the ions toward another electrode (termed the "collecting" and/or "attracting" electrode), thereby imparting momentum to the ions in a direction toward the attracting electrode. Collisions between the ions and the fluid, such as surrounding air molecules, transfer the momentum of the ions to the fluid inducing a corresponding movement of the fluid.

U.S. Pat. No. 4,789,801 of Lee, U.S. Pat. No. 5,667,564 of Weinberg, U.S. Pat. No. 6,176,977 of Taylor, et al., and U.S. Pat. No. 4,643,745 of Sakakibara, et al. also describe air movement devices that accelerate air using an electrostatic field. Air velocity achieved in these devices is very low and is not practical for commercial or industrial applications.

U.S. Pat. Nos. 3,699,387 and 3,751,715 of Edwards describe the use of multiple stages of Electrostatic Air Accelerators (EFA) placed in succession to enhance air flow. These devices use a conductive mesh as an attracting (collecting) electrode, the mesh separating neighboring corona electrodes. The mesh presents a significant air resistance and impairs air flow thereby preventing the EFA from attaining desirable higher flow rates.

Unfortunately, none of these devices are able to produce a commercially viable amount of the airflow. Providing multiple stages of conventional air movement devices cannot, in and of itself, provide a solution. For example, five serial stages of electrostatic fluid accelerators placed in succession deliver only a 17% greater airflow than one stage alone. See, for example, U.S. Pat. No. 4,231,766 of Spurgin.

Accordingly, a need exists for a practical electrostatic fluid accelerator capable of producing commercially useful flow rates.

SUMMARY OF THE INVENTION

The invention addresses several deficiencies in the prior art limitations on air flow and general inability to attain theoretical optimal performance. One of these deficiencies includes excessive size requirements for multi-stage EFA devices since several stages of EFA, placed in succession, require substantial length along an air duct (i.e., along air flow direction). This lengthy duct further presents greater resistance to air flow.

Still other problems arise when stages are placed close to each. Reduced spacing between stages may produce a "back corona" between an attractor electrode of one stage and a corona discharge electrode of an adjacent next stage that results in a reversed air flow. Moreover, due to the electrical capacitance between the neighboring stages, there is a parasitic current flow between neighboring stages. This current is caused by non-synchronous high voltage ripples or high voltage pulses between neighboring stages.

Still another problem develops using large or multiple stages so that each separate (or groups of) stage(s) is provided with its own high voltage power supply (HVPS). In this case, the high voltage required to create the corona discharge may lead to an unacceptable level of sparks being generated between the electrodes. When a spark is generated, the HVPS must completely shut down for some period of time required for deionization and spark quenching prior to resuming operation. As the number of electrodes increases, sparks are generated more frequently than with one set of electrodes. If one HVPS feeds several sets of electrodes (i.e., several stages) then it will be necessary to shut down more frequently to extinguish the increased number of sparks generated. That leads to an undesirable increase in power interruption for the system as a whole. To address this problem, it may be beneficial to feed each stage from its own dedicated HVPS. However, using separate HVPS requires that consecutive stages be more widely spaced to avoid undesirable electrical interactions caused by stray capacitance between the electrodes of neighboring stages and to avoid production of a back corona.

The present invention represents an innovative solution to increase airflow by closely spacing EFA stages while minimizing or avoiding the introduction of undesired effects. The invention implements a combination of electrode geometry, mutual location and the electric voltage applied to the electrodes to provide enhanced performance.

According to an embodiment of the invention, a plurality of corona electrodes and collecting electrodes are positioned parallel to each other or extending between respective planes perpendicular to an airflow direction. All the electrodes of neighboring stages are parallel to each other, with all the electrodes of the same kind (i.e., corona discharge electrodes or collecting electrodes) placed in the same parallel planes that are orthogonal to the planes where electrodes of the same kind or electrodes edges are located. According to another feature, stages are closely spaced to avoid or minimize any corona discharge between the electrodes of neighboring stages. If the closest spacing between adjacent electrodes is "a", the ratio of potential differences ($V1-V2$) between a voltage $V1$ applied to the first electrode and a voltage $V2$ applied to the closest second electrode, and the distance between the electrodes is a normalized distance "aN", then $aN=(V1-V2)/a$. The normalized distance between the corona discharge wire of one stage to the closest part of the neighboring stage should exceed the corona onset voltage applied between these electrodes, which, in practice, means that it should be no less than 1.2 to 2.0 times of the normalized distance from the corona discharge to the corresponding associated (i.e., nearest) attracting electrode(s) in order to prevent creation of a back corona.

Finally, voltages applied to neighboring stages should be synchronized and syn-phased. That is, a.c. components of the voltages applied to the electrodes of neighboring stages should rise and fall simultaneously and have substantially the same waveform and magnitude and/or amplitude.

The present invention increases EFA electrode density (typically measured in stages-per-unit-length) and eliminates or significantly decreases stray currents between the electrodes. At the same time, the invention eliminates corona discharge between electrodes of neighboring stages (e.g., back corona). This is accomplished, in part, by powering neighboring EFA stages with substantially the same voltage waveform, i.e., the potentials on the neighboring electrodes have the same or very similar alternating components so as to eliminate or reduce any a.c. differential voltage between stages. Operating in such a synchronous manner between stages, electrical potential differences between neighboring electrodes of adjacent EFA components remains constant and any resultant stray current from one electrode to another is minimized or completely avoided. Synchronization may be implemented by different means, but most easily by powering neighboring EFA components with respective synchronous and syn-phased voltages from corresponding power supplies, or with power supplies synchronized to provide similar amplitude a.c. components of the respective applied voltages. This may be achieved with the same power supply connected to neighboring EFA components or with different, preferably matched power supplies that produce synchronous and syn-phased a.c. component of the applied voltage.

DESCRIPTION OF THE PREFERRED EMBODIMENT

Figure 1B:
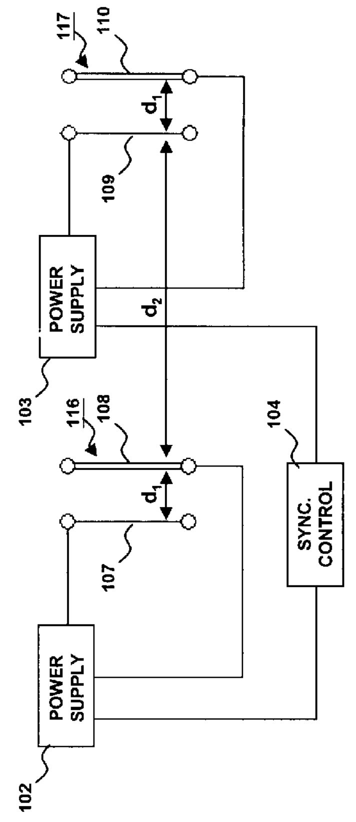
FIG. 1B is a schematic diagram of an EFA assembly with a pair of synchronized power supplies feeding respective adjacent corona discharge stages.
Figure 1A:
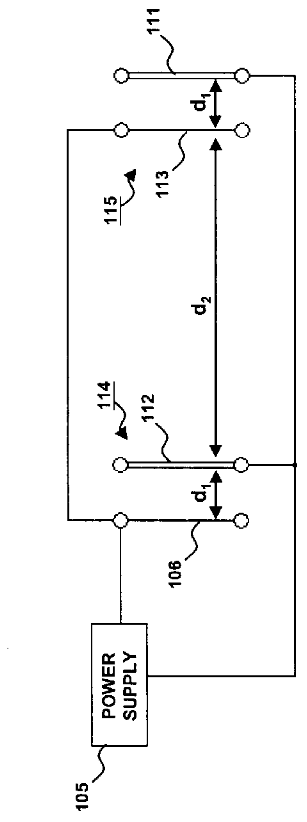
FIG. 1A is a schematic diagram of an Electrostatic Fluid Accelerator (EFA) assembly with a single high voltage power supply feeding adjacent corona discharge stages.

FIG. 1A is a schematic diagram of an Electrostatic Fluid Accelerator (EFA) device 100 comprising two EFA stages 114 and 115. First EFA stage 114 includes corona discharge electrode 106 and associated accelerating electrode 112; second EFA stage 115 includes corona discharge electrode 113 and associated accelerating electrode 111. Both EFA stages and all the electrodes are shown schematically. Only one set of corona discharge and collecting electrodes are shown per stage for ease of illustration, although it is expected that each stage may include a large number of arrayed pairs of corona and accelerating electrodes. An important feature of EFA 100 is that the distance $d_1$ between the corona discharge electrode 106 and collector electrode 112 is comparable to the distance $d_2$ between collector electrode 112 and the corona discharge electrode 113 of the subsequent stage 115, i.e., the closest distance between elements of adjacent stages is not much greater than the distance between electrodes within the same stage. Typically, the inter-stage distance $d_2$ between collector electrode 112 and corona discharge electrode 113 of the adjacent stage should be between 1.2 and 2.0 times that of the intra-stage spacing distance $d_1$ between corona discharge electrode 106 and collector electrode 112 (or spacing between corona discharge electrode 113, and collector electrode 111) within the same stage. Because of this consistent spacing, capacitance between electrodes 106 and 112 and between 106 and 113 are of the same order. Note that, in this arrangement, the capacitance coupling between corona discharge electrodes 106 and 113 may allow some parasitic current to flow between the electrodes. This parasitic current is of the same order of amplitude as a capacitive current between electrode pair 106 and 112. To decrease unnecessary current between electrodes 113 and 106, each should be supplied with synchronized high voltage waveforms. In the embodiment depicted in FIG. 1A both EFA stages are powered by a common power supply 105 i.e., a power supply having a single voltage conversion circuit (e.g., power transformer, rectifier, and filtering circuits, etc.) feeding both stages in parallel. This ensures that the voltage difference between electrodes 106 and 113 is maintained constant relative to electrodes 106 and 111 so that no or only a very small current flows between electrodes 106 and 113.

FIG. 1A is a schematic diagram of an Electrostatic Fluid Accelerator (EFA) device 100 comprising two EFA stages 114 and 115. First EFA stage 114 includes corona discharge electrode 106 and associated accelerating electrode 112; second EFA stage 115 includes corona discharge electrode 113 and associated accelerating electrode 111. Both EFA stages and all the electrodes are shown schematically. Only one set of corona discharge and collecting electrodes are shown per stage for ease of illustration, although it is expected that each stage may include a large number of arrayed pairs of corona and accelerating electrodes. An important feature of EFA 100 is that the distance $d_1$ between the corona discharge electrode 106 and collector electrode 112 is comparable to the distance $d_2$ between collector electrode 112 and the corona discharge electrode 113 of the subsequent stage 115, i.e., the closest distance between elements of adjacent stages is not much greater than the distance between electrodes within the same stage. Typically, the inter-stage distance $d_2$ between collector electrode 112 and corona discharge electrode 113 of the adjacent stage should be between 1.2 and 2.0 times that of the intra-stage spacing distance $d_1$ between corona discharge electrode 106 and collector electrode 112 (or spacing between corona discharge electrode 113, and collector electrode 111) within the same stage. Because of this consistent spacing, capacitance between electrodes 106 and 112 and between 106 and 113 are of the same order. Note that, in this arrangement, the capacitance coupling between corona discharge electrodes 106 and 113 may allow some parasitic current to flow between the electrodes. This parasitic current is of the same order of amplitude as a capacitive current between electrode pair 106 and 112. To decrease unnecessary current between electrodes 113 and 106, each should be supplied with synchronized high voltage waveforms. In the embodiment depicted in FIG. 1A both EFA stages are powered by a common power supply 105 i.e., a power supply having a single voltage conversion circuit or “converter" (e.g., power transformer, rectifier, and filtering circuits, etc.) feeding both stages in parallel. This ensures that the voltage difference between electrodes 106 and 113 is maintained constant relative to electrodes 106 and 111 so that no or only a very small current flows between electrodes 106 and 113.

FIG. 1B shows an alternate configuration of an EFA 101 including a pair of EFA stages 116 and 117 powered by separate converters in the form of power supplies 102 and 103, respectively. First EFA stage 116 includes corona discharge electrode 107 and collecting electrode 108 forming a pair of complementary electrodes within stage 116. Second EFA stage 117 includes corona discharge electrode 109 and collecting electrode 110 forming a second pair of complementary electrodes. Both EFA stage 116, 117 and all electrodes 107–110 are shown schematically.

Figure 2B:
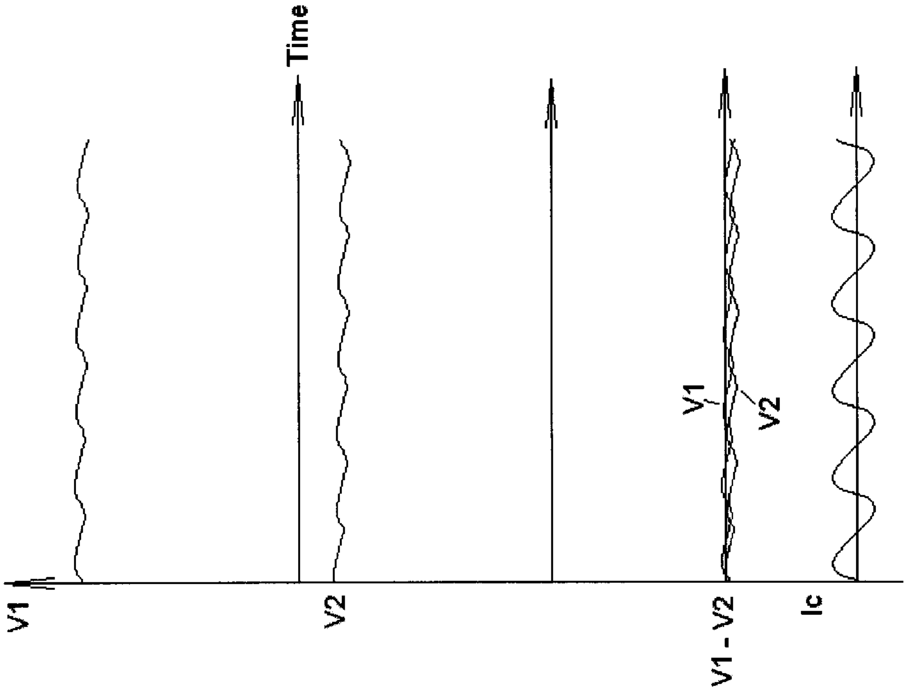
FIG. 2B is a timing diagram of voltages and currents between electrodes of neighboring EFA stages where a small voltage ripple exists between stages.
Figure 2A:
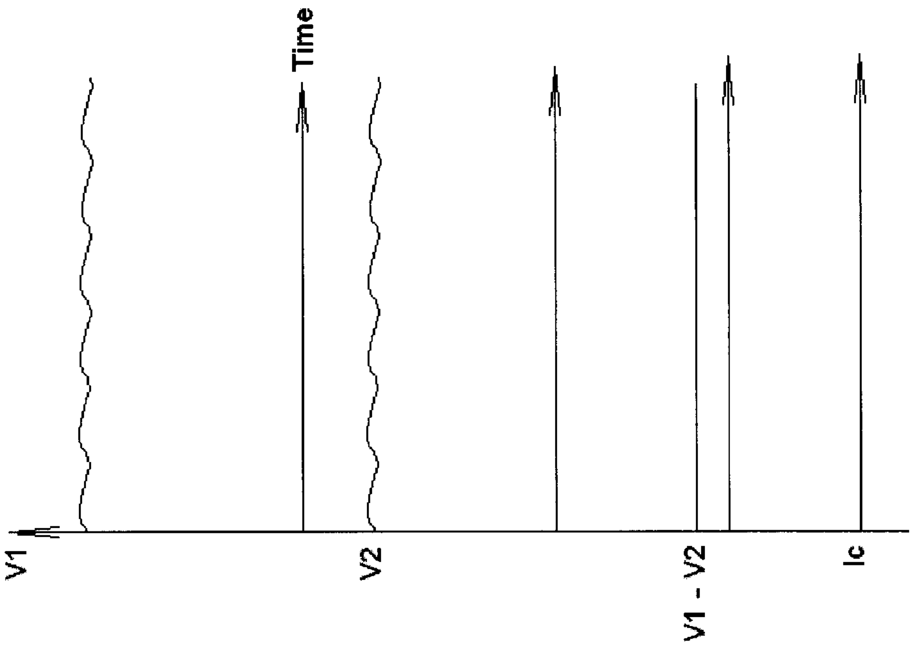
FIG. 2A is a timing diagram of voltages and currents between electrodes of neighboring EPA stages with no a.c. differential voltage component between the stages.

The reduction of parasitic capacitive current between electrodes of adjacent EPA stages can be seen with reference to the waveforms depicted in FIGS. 2A and 2B. As seen in the FIG. 2A, voltage V1 present on electrode 107 (FIG. 1B) and voltage V2 present on electrode 109 are synchronized and syn-phased, but not necessarily equal in d.c. amplitude. Because of complete synchronization, the difference V1−V2 between the voltages present on electrodes 107 and 109 is near constant representing only a d.c. offset value between the signals (i.e., no a.c. component). A current Ic flowing through the capacitive coupling between electrode 107 and electrode 109 is proportioned to the time rate of change (dV/dt) of the voltage across this capacitance:

$$I_C=C^*[d(V1-V2)/dt].$$

It directly follows from this relationship that, if the voltage across any capacitance is held constant (i.e., has no a.c. component), no current flows the path. On the other hand, even small voltage changes may create large capacitive current flows if the voltage changes quickly (i.e., large d(V1−V2)/dt). In order to avoid excessive current flowing from the different electrodes of the neighboring EFA stages, voltages applied to the electrodes of these neighboring stages should be synchronized and syn-phased. For example, with reference to FIG. 2B, corona voltage V1 and V2 are slightly out of synchronization resulting in a small a.c. voltage component in the difference, d(V1−V2)/dt. This small a.c. voltage component results in a significant parasitic current Ic flowing between adjacent EFA stages. An embodiment of the present invention includes synchronization of power applied to all stages to avoid current flow between stages.

The closest spacing of electrodes of adjacent EFA stages may be approximated as follows. Note that a typical EFA operates efficiently over a rather narrow voltage range. The voltage $V_c$ applied between the corona discharge and collecting electrodes of the same stage should exceed the so called corona onset voltage $V_{onset}$ for proper operation. That is, when voltage $V_c$ is less than $V_{onset}$, no corona discharge occurs and no air movement is generated. At the same time $V_c$ should not exceed the dielectric breakdown voltage $V_b$ so as to avoid arcing. Depending on electrodes geometry and other conditions, $V_b$ may be more than twice as much as $V_{onset}$. For typical electrode configurations, the $V_b/V_{onset}$ ratio is about 1.4–1.8 such that any particular corona discharge electrode should not be situated at a distance from a neighboring collecting electrode where it may generate a "back corona." Therefore, the normalized distance aNn between closest electrodes of neighboring stages should be at least 1.2 times greater than the normalized distance "aNc" between the corona discharge and the collecting electrodes of the same stage and preferably not more than 2 times greater than distance "aNc." That is, electrodes of neighboring stages should be spaced so as to ensure that a voltage difference between the electrodes is less than the corona onset voltage between any electrodes of the neighboring stages.

If the above stated conditions are not satisfied, a necessary consequence is that neighboring stages must be further and more widely spaced from each other than otherwise. Such increased spacing between stages results in several conditions adversely affecting air movement. For example, increased spacing between neighboring stages leads to a longer duct and, consequently, to greater resistance to airflow. The overall size and weight of the EFA is also increased. With synchronized and syn-phased HVPSs, these negative aspects are avoided by allowing for reduced spacing between HFA stages without reducing efficiency or increasing spark generation.

Figure 3:
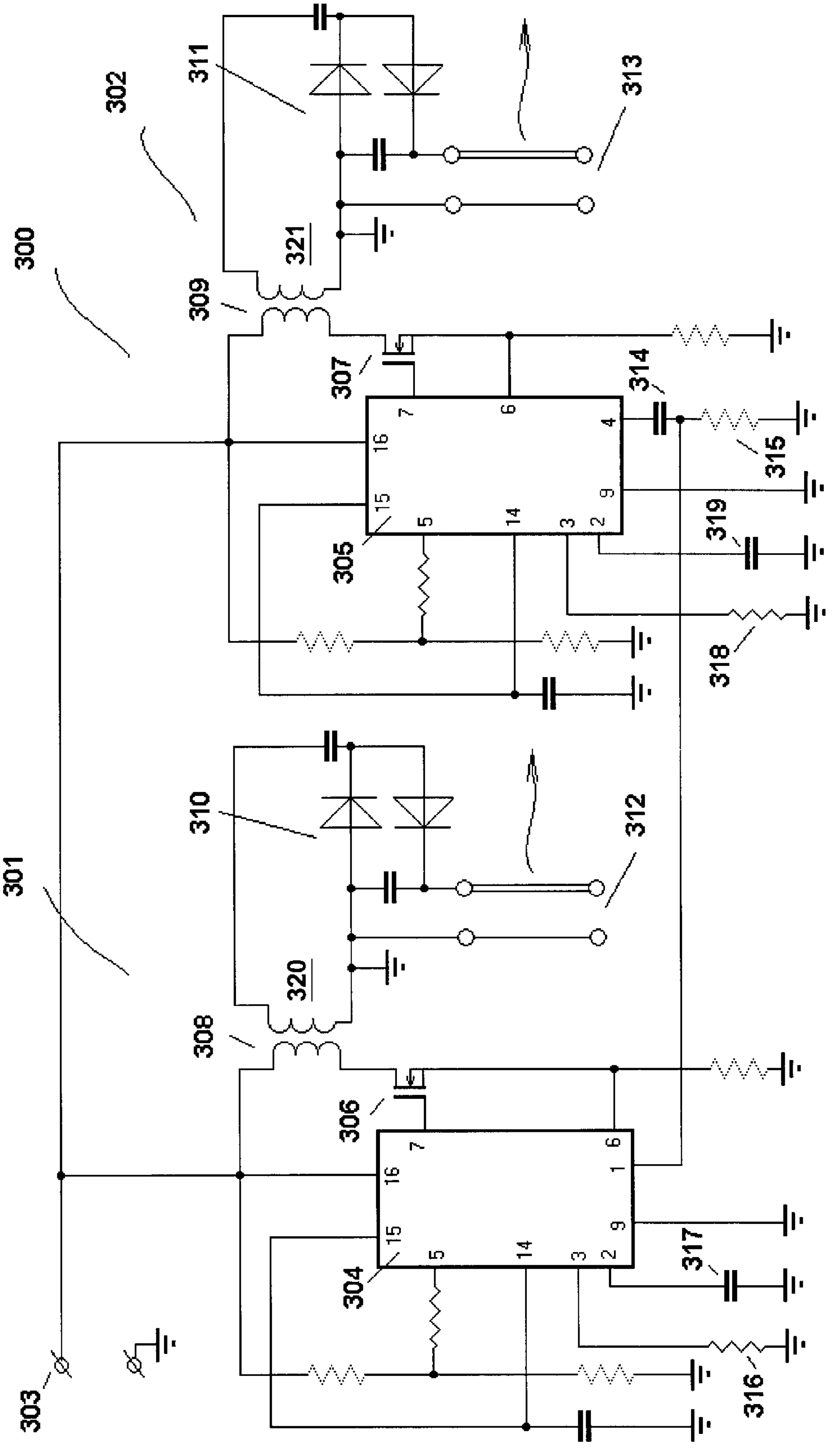
FIG. 3 is a schematic diagram of a power supply unit including a pair of high voltage power supply subassemblies having synchronized output voltages.

Referring to FIG. 3, a two stage EFA 300 includes a pair of converters in the form of HVPSs 301 and 302 associated with respective first and second stages 312 and 313. Both stages are substantially identical and are supplied with electrical power by identical HVPSs 301 and 302. HVPSs 301 and 302 include respective pulse width modulation (PWM) controllers 304 and 305, power transistors 306 and 307, high voltage inductors 308 and 309 (i.e., transformers or filtering chokes) and voltage doublers 320 and 321, each voltage doubler including rectifier circuits 310 and 311. HVPSs 301 and 302 provide power to respective EFA corona discharge electrodes of stages 312 and 313. As before, although EFA electrodes of stages 312 and 313 are diagrammatically depicted as single pairs of one corona discharge electrode and one accelerator (or attractor) electrode, each stage would typically include multiple pairs of electrodes configured in a two-dimensional array. PWM controllers 304, 305 generate (and provide at pin 7) high frequency pulses to the gates of respective power transistors 306 and 307. The frequency of these pulses is determined by respective RC timing circuits including resistor 316 and capacitor 317, and resistor 318 and the capacitor 319. Ordinarily, slight differences between values of these components between stages results in slightly different operating frequencies of the two HVPS stages which typically supply an output voltage within a range of 50 Hz to 1000 kHz. However, even a slight variation in frequency leads to non-synchronous operation of stages 312 and 313 of EFA 300. Thus, to ensure the synchronous and syn-phased (i.e., zero phase shift or difference) operation of power supplies 301 and 302, controller 305 is connected to receive a synchronization signal pulse from pin 1 of the PWM controller 304 via a synchronization input circuit including resistor 315 and capacitor 314. This arrangement synchronizes PWM controller 305 to PWM controller 304 so that both PWM controllers output voltage pulses that are both synchronous (same frequency) and syn-phased (same phase).

Figure 4A:
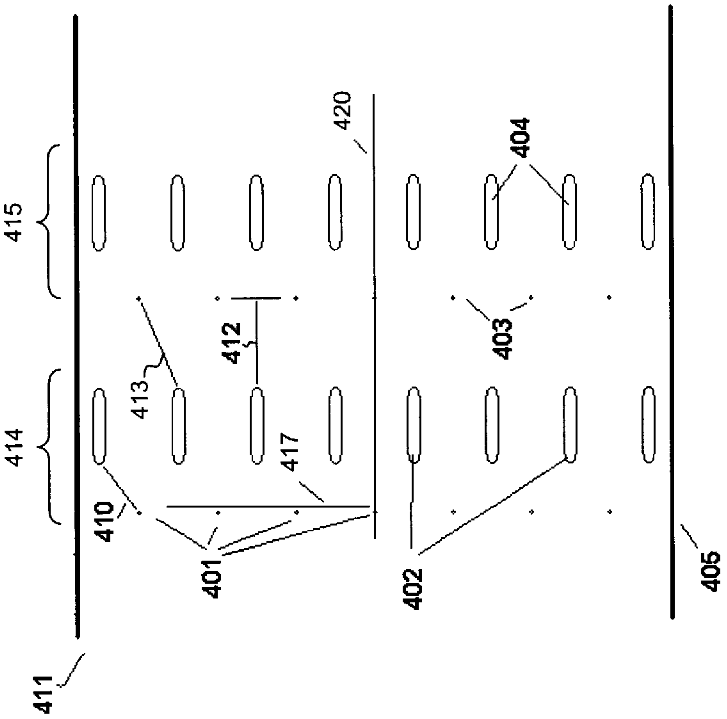
FIG. 4A is a schematic top view of a two stage EFA assembly implementing a first electrode placement geometry.
Figure 4B:
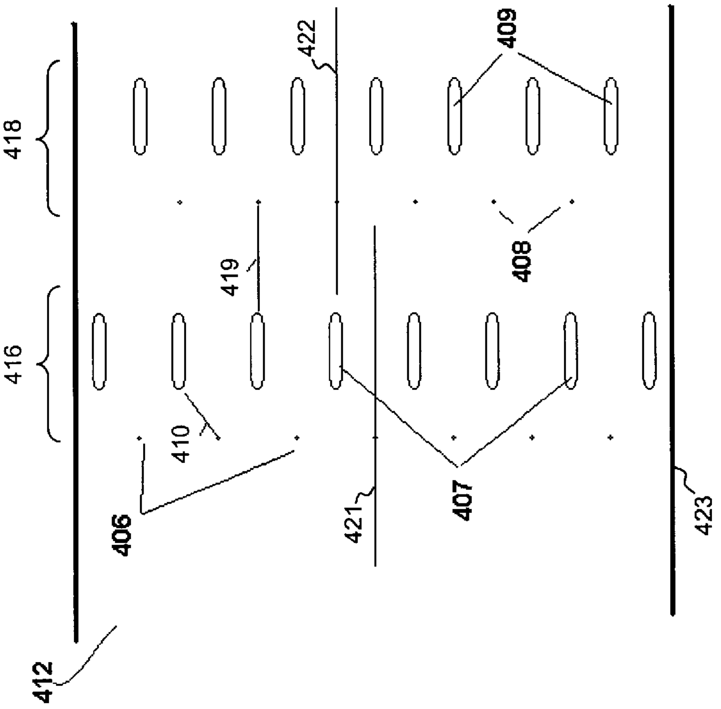
FIG. 4B is a schematic top view of a two stage EFA assembly implementing a second electrode placement geometry.

FIGS. 4A and 4B are cross-sectional views of two different arrangements of two-stage EFA devices. Although only two stages are illustrated, the principles and structure detailed is equally. With reference to FIG. 4A, first EFA device 411 consists of two serial or tandem stages 414 and 415. First stage 414 contains a plurality of parallel corona discharge electrodes 401 aligned in a first vertical column and collecting electrodes 402 aligned in a second columns parallel to the column of corona discharge electrodes 401. All the electrodes are shown in cross-section longitudinally extending in to and out from the page. Corona discharge electrodes 401 may be in the form of conductive wires as illustrated, although other configurations may be used. Collecting electrodes 402 are shown horizontally elongate as conductive bars. Again, this is for purposes of illustration; other geometries and configurations may be implemented consistent with various embodiments of the invention. Second stage 415 similarly contains a column of aligned corona discharge electrodes 403 (also shown as thin conductive wires extending perpendicular to the page) and collecting electrodes 404 (again as bars). All the electrodes are mounted within air duct 405. First and second stages 414 and 415 of EFA 411 are powered by respective separate HVPSs (not shown). The HVPSs are synchronized and syn-phased so the corona discharge electrodes 403 of second stage 415 may be placed at the closest possible normalized distance to collecting electrodes 402 of first stage 414 without adversely interacting and degrading EPA performance.

For the purposes of illustration, we assume that all voltages and components thereof (e.g., a.c. and d.c.) applied to the electrodes of neighboring stages 414 and 415 are equal. It is further assumed that high voltages are applied to the corona discharge electrodes 401 and 403 and that the collecting electrodes 402 and 404 are grounded, i.e., maintained at common ground potential relative to the high voltages applied to corona discharge electrodes 401 and 403. All electrodes are arranged in parallel vertical columns with corresponding electrodes of different stages horizontally aligned and vertically offset from the complementary electrode of its own stage in staggered columns. A normalized distance 410 between corona discharge electrodes 401 and the leading edges of the closest vertically adjacent collecting electrodes 402 is equal to aN1. Normalized distance aN2 (413) between corona electrodes 403 of the second stage and the trailing edges of collecting electrodes 402 of the first stage should be some distance aN2 greater that aN1, the actual distance depending of the specific voltage applied to the corona discharge electrodes. In any case, aN2 should be just greater than aN1, i.e., be within a range of 1 to 2 times distance aN1 and, more preferably, 1.1 to 1.65 times aN1 and even more preferably approximately 1.4 times aN1. In particular, as depicted in FIG. 4A, distance aN2 should be just greater than necessary to avoid a voltage between the corona onset voltage creating a current flow therebetween. Let us assume that this normalized "stant" distance aN2 is equal to 1.4×aN1. Then the horizontal distance 412 between neighboring stages is less than distance aN2 (413). As shown, intra-stage spacing is minimized when the same type of the electrodes of the neighboring stages are located in one plane 420 (as shown in FIG. 4A). Plane 414 may be defined as a plane orthogonal to the plane containing the edges of the corona discharge electrodes (plane 417 which is also substantially orthogonal to an airflow direction as shown in FIG. 4A). If the same type electrodes of neighboring states are located in different but parallel planes, such as planes 421 and 422 (as shown in FIG. 4B), the resultant mininimal spacing distance between electrodes of adjacent EFA stages is equal to aN2 as shown by line 419. Note that the length of line 419 is the same as distance 413 (aN2 ) and is greater than distance 412 so that inter-stage spacing is increased.

In summary, embodiments of the invention incorporate architectures satisfying one or more of three conditions in various combinations:

1. Electrodes of the neighboring EFA stages are powered with substantially the same voltage waveform, i.e., the potentials on the neighboring electrodes should have substantially same alternating components. Those alternating components should be close or identical in both magnitude and phase.
2. Neighboring EFA stages should be closely spaced, spacing between neighboring stages limited and determined by that distance which is just sufficient to avoid or minimize any corona discharge between the electrodes of the neighboring stages.
3. Same type electrodes of neighboring stages should be located in the same plane that is orthogonal to the plane at which the electrodes (or electrodes leading edges) are located.

It should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. An electrostatic fluid accelerator comprising:

a high voltage power source supplying a high voltage power at a particular output voltage and current, said voltage and current waveforms each including constant and alternating components; and an electrostatic fluid accelerator unit comprising a plurality of stages of electrodes, each of said stages of electrodes including a corona discharge electrode and a complementary electrode, said stages of electrodes arranged in tandem to sequentially accelerate a fluid passing therethrough, said electrodes connected to said high voltage power source to receive said high voltage power with substantially identical waveforms of said alternating component of said output voltage, wherein said high voltage power source comprises a plurality of converters for transforming and a primary power to said high voltage power, each of said converters independently connected to a respective one of said stages for providing said high voltage power thereto, said high voltage power source further comprising a controller connected to said converters for synchronizing said alternating components of said high voltage power provided by said converter.

2. The electrostatic fluid accelerator according to claim 1 wherein said high voltage power is supplied to each of said plurality of stages of electrostatic discharge elements substantially in phase and with substantially equal levels of said alternating component of said output voltage.

3. The electrostatic fluid accelerator according to claim 1 wherein said high voltage power is supplied to each of said plurality of stages of electrodes substantially in phase and with substantially equal levels of said components of said output currents.

4. The electrostatic fluid accelerator according to claim 1 wherein said converters each comprise a transformer and a rectifier circuit.

5. The electrostatic fluid accelerator according to claim 1 wherein said alternating component of said output voltage has a frequency range within 50 Hz to 1000 kHz, each of said stages of electrostatic discharge elements receiving said alternating voltage component in phase and with substantially equal amplitude.

6. The electrostatic fluid accelerator according to claim 1 wherein said alternating component of said current has a frequency range within 50 Hz to 1000 kHz, each of said stages of electrodes receiving said alternating current component in phase with each other and with substantially equal amplitudes.

7. The electrostatic fluid accelerator according to claim 1 wherein each of said stages of said electrode comprises a first regular array of corona discharge electrodes and a second regular array of accelerating electrodes, said corona discharge electrodes and accelerating electrodes oriented parallel to each other and each of said arrays of corona discharge electrodes spaced from each of said arrays of said accelerating electrodes of the same stage, corresponding ones of said electrodes of different ones of said stages being parallel to each other and to the electrodes of a nearest stage.

8. The electrostatic fluid accelerator according to claim 7 wherein corona discharge electrodes and accelerating electrodes of respective immediately adjacent ones of said stages are spaced apart by a distance d that is 1 to 2 times greater than a closest distance between ones of said corona discharge electrodes and immediately adjacent ones of the electrodes of each of said stages.

9. The electrostatic fluid accelerator according to claim 1 wherein each of said stages includes a plurality of corona discharge electrodes located in a common transverse plane, each of said transverse planes being substantially orthogonal to an airflow direction and ones of said corona discharge electrodes of neighboring ones of said stages located in respective common planes orthogonal to said transverse planes.

10. The electrostatic fluid accelerator according to claim 1 wherein each of said stages includes a plurality of parallel corona discharge wires positioned in a first plane and a plurality of parallel accelerating electrodes having edges closest to the corona discharge electrodes aligned in respective second plane, said first and second planes parallel to each other and perpendicular to a common average airflow direction through said stages.

11. An electrostatic fluid accelerator comprising:

a high voltage power source supplying a high voltage power including a plurality of output circuits each independently supplying a respective electrical output power signal substantially in phase with each other; and an electrostatic fluid air accelerator unit comprising a plurality of stages each of said stages including a first array of corona discharge electrodes and a second array of attractor electrodes spaced apart from said first array along an airflow direction, each of said stages connected to a respective one of said output circuits for supplying a corresponding one of said electrical output power signals to said corona discharge and attractor electrodes of corresponding ones of said first and second arrays, wherein said high voltage power source said high voltage power further comprises a plurality of transformers, rectifier circuits and controllers connected to respective ones of said output circuits, each of said controllers connected to at least one other of said controllers for synchronizing an said electrical output power signals.

12. The electrostatic fluid accelerator according to claim 11 wherein each of said electrical output power signals has an a.c. component having a fundamental operating frequency within a range of 50 Hz to 1000 kHz.

13. A method of accelerating a fluid including the steps of:

transforming a primary power signal into a plurality of independent voltages each of said voltages including independent high frequency power signals;

synchronizing said plurality of independent high frequency power signals to a common frequency and phase;

powering arrays of corona discharge and accelerating electrodes with respective ones of said high voltages; and accelerating a the fluid through each of said arrays in sequence.

14. The method according to claim 13 wherein said step of transforming includes steps of increasing the voltage of said primary power signal to provide a plurality of high voltage alternating secondary power signals and independently rectifying said plurality of high voltage alternating secondary power signals to provide a plurality of high voltage output power signals.

* * * * *